Patented Nov. 10, 1942

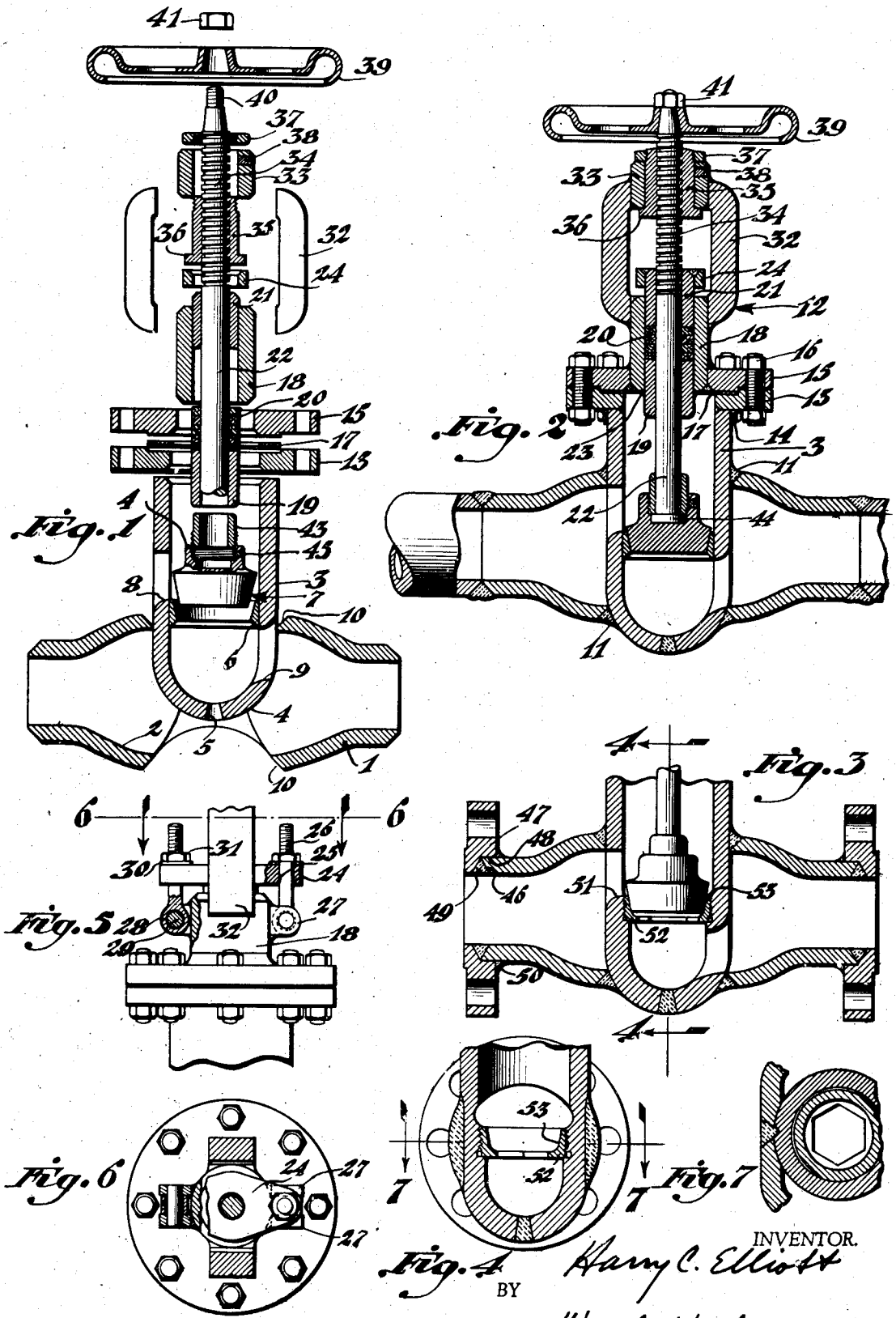

2,301,176

UNITED STATES PATENT OFFICE 2,301,176

VALVE CONSTRUCTION

Harry C. Elliott, Cincinnati, Ohio

Application August 12, 1940, Serial No. 352,200

4 Claims. (Cl. 251—156)

This invention is directed to valves for controlling flow of fluid through pipe lines and the like. It is directed particularly to an inexpensive construction for globe valves of the type in which a valve head is operable in conjunction with an annular seat therefor. The valves of the present invention are usually of substantial size, for example, of the type adapted to be used in conjunction with pipe lines of diameter larger than approximately two or three inches.

Conventional globe valves of this general size and capacity are large heavy units constructed of castings or forgings which are carefully machined. The construction of such units is an expensive procedure, and the walls are always of substantial thickness so that a factor of safety is provided to compensate for possible imperfections in the metal. To make the forgings or the castings, as the case may be, patterns or dies are required and these further increase the cost of making the finished units.

The principal object of the present invention has been to utilize seamless tubing in the construction of valves. The metal tubing of this sort is remarkably strong and free from imperfections and for this reason it is inherently superior to metal which has been formed by casting or forging.

A further object of the invention has been to provide a means for making valves quickly and inexpensively and for avoiding the usual details incidental to the production of patterns of dies. In this respect the invention has found particular utility on board ships or in isolated localities where the prompt replacement of a broken valve is requisite to avoid serious loss or prolonged delay.

While the use of seamless tubing in the manufacture of valves has been proposed in the past, the various valve constructions which have been suggested have been complex and for that reason seamless tubing has never found extensive usage in valve manufacture. The principal object of the present invention has been to devise a structure for a valve body which is comprised of but a few pieces of tubing which can be readily fastened and joined together by the use of conventional torch cutting and welding apparatus.

The globe valves of the present invention are comprised of a tubular body which may or may not, depending upon the size of the valve, be of reduced diameter at its endwise portions. A hole is cut transversely in this cylindrical body and another piece of tubing having one end closed as by swaging or by welding of a blank therein, is inserted in the hole and welded to the body. Opposite the closed end the transverse tubing carries a valve bonnet, and at a point interiorly of the valve body it is provided with a seat to receive the valve head extending from the bonnet. At points above and below the seat the transverse tube is bored for passage of fluid from the body of the valve through the valve seat and out the other side. The diameter of the hole cut transversely in the cylindrical body is greater than the internal diameter of the cylindrical body but substantially less than its external diameter and the second piece of tubing is fitted snugly within this hole. In this manner no openings are permitted between the outside surface of the second piece of tubing and the inside surface of the valve body through which fluid might bypass the valve seat. In other words, the bore is of such diameter that it cuts into the wall of the valve body at its widest point thereby permitting the second tubular member to close off the entire opening through the valve body and permit fluid to flow only through the valve seat and passageways above and below it. In substance the body of the globe valve of the present invention, aside from the bonnet itself, is comprised of only two pieces of tubing, with the valve seat located in the one of them, and these pieces of tubing readily are fastened by the use of an ordinary welding torch. It is for this reason that the valves may be constructed cheaply and quickly at any time they are needed, without the use of extensive machine shop equipment.

Other features of the present invention are shown in the drawing and described in the following description of the structures illustrated in the drawing.

In the drawing:

Figure 1 is an "exploded" view of the various parts of which a typical globe valve is made in accordance with the present invention.

Figure 2 is a cross sectional view showing the parts in assembly.

Figure 3 is a cross sectional view of a modified arrangement of the valve seat in the transverse tube.

Figure 4 is a transverse section taken on the line 4—4 of Figure 3.

Figure 5 is a fragmentary elevation showing the "take-up" mechanism for the packing gland at the valve stem.

Figure 6 is a sectional view taken on the line 6—6 of Figure 5.

Figure 7 is a fragmentary sectional view taken on the line 7—7 of Figure 4.

The body of the valve is comprised of a tubular element 1 as shown in Figure 1. This member is made from a piece of tubing which is of uniform diameter and in most instances, though not necessarily, the ends of the piece are fashioned as by swaging so that they are of reduced cross sectional area, that is, the piece of tubing selected for the body usually is larger than the piping in which the valve ultimately is to be installed in order that a center portion 2 in the body of the valve be of enlarged cross sectional area relative to the ends at which the valve is connected in the pipe line.

The valve body is bored transversely, or a hole is cut through it as by a cutting torch, and, in this aperture, a piece of tubing 3 is inserted. It is recommended that all of the dimensions be so adjusted that the internal diameter of the transverse piece of tubing 3 is substantially the same as the diameter of the openings at the ends of the valve body, to avoid substantial constriction of the flow of fluid through the valve.

The transverse tubing 3 is closed at one end as at 4. For this purpose either a blank may be welded across the end of the tube, or the end of the tube may be closed by a typical swaging operation; in the latter instance the aperture 5 remains and this aperture etiher may be threaded to receive a drain cock or it may be filled by welding.

At a point above the enclosure 4 of the transverse tube and at a location interiorly of the valve body, the valve seat member 6 is installed in the transverse tube 3. This seat provides an annular chamfered seat surface which is arranged concentrically within the transverse tubing member for the reception of a valve disc 7. The various ways in which this seat most conveniently is provided are disclosed at later points in the specification.

Apertures 8 and 9 are cut in the transverse tubing 3, at points respectively above and below the valve seat 6. Both apertures reside within the body 2 of the valve and, with the valve seat 6, form the passageway for fluid through the valve.

In the preferred structure, the apertures cut in the body 2 of the valve are chamfered as at 10 so that when the transverse tubing is installed in the valve body annular concavities are provided which readily may be filled by welding 11 to provide a firm connection of the body of the valve and the transverse member. In this manner the metal at the points of connection forms a homogeneous structure with the metal of the parts which it connects together.

The transverse tubing 3 extends above the valve body, at the side opposite the enclosure of it, for the reception of the bonnet apparatus, indicated generally at 12, through which the valve disc 7 is adjusted relative to its seating surface.

In the preferred embodiment, a flange 13 is welded, as at 14, to the upper end of the transverse tubing 3 and this flange is arranged for engagement with a complementary flange 15 from which the bonnet apparatus is supported, the two being connected together by the radially spaced bolts 16, with the gasket 17 disposed between the flanges.

An annular tubular member 18 is welded in a central bore in the flange 15, and a sleeve 19 is provided within the latter member at the inner end of it to form a seat for packing 20 thereabove. A packing sleeve 21 is provided at the other end of the tubular member 18 with the inward end of it in compressing engagement with the packing material. Valve stem 22 extends through the nut 21, sleeve 19, and the packing material 20 into the valve body to carry the disc 7.

The sleeve 19 may be welded into the annular tube 18, as at 23, or may be threadedly connected to it, while the packing nut 21 preferably is in slideable telescopic connection therewith, so that it may be removed periodically for replacement of the packing, and for adjusting the compression upon the packing in case there is leakage at the stem.

For this purpose, in the illustrated structure, the nut or sleeve 21 extends above the member 18 and it carries a wing-shaped draw plate member 24 which is bored centrally, slipped over the sleeve 21, then welded to it as shown best in Figure 2. The wing portions of the member 24 extend outwardly from the sleeve and contain bores or apertures 25 at the endwise portions of them, respectively, within which the draw bolts 26 are located. Pairs of ears 27, 27 are welded to the exterior of the sleeve 18 so as respectively to receive therebetween the ring heads 28 provided on the draw bolts, and clevis or pivot pins 29 extend through appropriate bores in the ears and draw bolt rings to pivotally connect these members. The draw bolts are threaded and carry washers 30 and nuts 31 above the wing-shaped draw plate 24. It will be seen therefore that by tightening the nuts 31 the compression on the packing 20 readily can be adjusted. If the bonnet is to be disassembled the nuts may be removed, the wing plate and sleeve 21 taken out, and the draw bolts 26 swung outwardly to make the rest of the bonnet parts more accessible.

In place of the draw plate and bolt arrangement just described, especially in valves of smaller size, the sleeve 21 may be threaded into the sleeve 18 for suitable direct adjustment.

Located above the packing assembly of the valve bonnet, arms 32 are also welded to the tubing member 18 to extend above it at opposite sides of the wing-shaped member 24, and carry a ring 33 therebetween. These arms readily may be constructed of bar steel or the like.

The valve stem 22 is threaded at its upper end, as at 34, and the ring 33 carries a nut 35; the nut is bored and threaded internally to engage the threaded portion of the stem, and the lower end of it comprises a flange 36 which engages the adjacent face of the ring 33.

The other end of the nut is externally threaded to carry a nut 37 which is positioned for engagement with the upper end of the nut supporting ring. Therefore, the stem nut 35 is mounted stationarily within its supporting ring, and, to prevent it from rotating when the valve stem is operated, a set screw 38 is employed to extend through the wall of the support ring 33.

Above the stem nut 35, the stem of the valve carries a hand wheel 39. This wheel is mounted to the stem in the usual manner, that is, the stem is tapered for engagement with a complementary tapered bore in the hand wheel, and terminates in a threaded stud 40 which carries a nut 41 for locking the hand wheel thereto.

Valve disc 7 is a tapered plug configurated to fit the contour of the valve seat 6. The disc is bored and threaded as at 42 to fit the thread of a retaining member 43, the latter member being bored to slip over the valve stem and rest against a head 44 of enlarged diameter provided at the end of the stem. Retaining member 43 engages the valve disc with the head 44 positioned therebetween. Therefore, the disc is free to rotate relative to the stem but is immovable axially of it. Set screw 45 locks the disc to the retaining member.

Those skilled in the art readily will comprehend that the various parts forming the valve assembly may be manufactured with ordinary blacksmith shop facilities, that is, the usual welding and forging equipment and the lathe. No special dies, tools or fixtures are required and for this reason a valve constructed in accordance with the present invention may be assembled under conditions otherwise wholly inadequate for the purpose.

Aside from simplicity of construction, however, the valves of the present invention exhibit unusual service qualities. The steel tubing of which the body portions are constructed is of a homogeneous nature, free from flaws and defects and, therefore, capable of withstanding unusually great strains. Such tubing is available in various alloy forms which may be employed when high pressure, high temperature, or corrosive fluids are to be controlled.

The valve shown in Figures 1 and 2 is of a type suited for installation in welded pipe work systems. The valve shown in Figure 3 is a form modified for use in conjunction with flanged piping systems. In this instance the terminals of the tubing forming the endwise portions of the body of the valve are chamferred inwardly, as indicated at 46, and flange members 47, which are otherwise of the usual size and dimensions, are bored internally as at 48 to provide seats for the reception of the endwise portions of the body tubing; these seats likewise are chamferred so that annular V shaped grooves are made available to be filled with metal by welding metal 49. The flanges also are welded to the valve at the exterior, as at 50.

The valve seats of the valves of the present invention may be provided most easily by building up an annular head of metal with a torch or electrode, at the interior of the transverse tube 3, then machining this head to the desired contour. In this manner the seats of stainless steel, Monel metal or other resistant alloys can be provided by using welding rods of the metal of which the seat is to be formed. However, the valve shown in Figure 3 also embodies a modified form of valve seat. In this instance the upper portion of the transverse tubing 3 of the valve is bored as at 51 to a point approximately intermediate the fluid apertures 8 and 9 and a threaded portion 52 of slightly smaller diameter is provided for the reception of a removable valve seat 53. This seat is provided with a hexagonal bore for reception of a plug wrench with which to remove the seat.

As shown in Figure 4, the transverse tubing 3 is of such diameter relative to the internal diameter of the body of the valve and the bore within which it extends, that the two may be connected together by welding at points other than the annular bore apertures, thereby preventing any flow or leak intermediate the exterior of the transverse tube and the interior of the body. Thus the transverse tubing of the valve shown fragmentarily in Figure 4 is of slightly larger diameter than the internal diameter of the enlarged portion of the body so that there be greater area of contact between the transverse tube and the body of the valve. In this structure, the transverse tube is counterturned to fit within the transverse bore in the valve body and, in addition to the annular seam welding, at the bore apertures, the two members may be welded together as shown in Figure 7.

While the transverse member 3 of the valves shown in the drawing extends at substantially right angles to the body member, the apertures for the reception of it may be cut through the body at an angle thereto if angle type valves are desired for special installation purposes.

Various modifications readily will be understood by those skilled in the art by the foregoing description of the preferred embodiment of the invention and it will be understood that the invention is not to be limited to the details which have been disclosed excepting by the scope of the claims which follow.

Having described my invention, I claim:

1. A valve constructed of seamless steel tubular members which are in welded relationship with one another, comprising a tubular body having a bore extending therethrough transversely, the diameter of which is slightly greater than the internal diameter of the tubular body but substantially less than the external diameter thereof a second tubular member fitted snugly within said bore, said second member having a rounded endwise closure at one end and being welded to said body at points adjacent said bore in said body, and said second member having at its internal diameter a shoulder located within the confines of the first tubular body and having openings respectively above and below said shoulder at the opposite sides thereof, the said openings communicating with the tubular opening in the first tubular body.

2. A valve constructed of tubular members which are in welded relationship with one another, comprising a tubular body having a bore extending therethrough transversely the said bore being of greater diameter than the internal diameter of the tubular body but substantially less than the external diameter thereof, a second tubular member having one end closed, the said second tubular member having that portion of it adjacent said closed end fitting snugly within the entire bore in said tubular body said second tubular body being welded to said first body at the junctures of the second tubular body with the first, a shoulder constituted by an annular rib of welding metal extending from the interior face of said transverse tubular body for providing a valve seat and having apertures extending transversely through the second tubular body respectively at the opposite sides thereof above and below the said shoulder.

3. A valve constructed of tubular members which are in welded relationship with one another, comprising a tubular body having an enlarged central portion, and having a bore extending therethrough transversely, the diameter of said bore being slightly greater than the interior diameter of the enlarged central portion of the tubular body but substantially less than the external diameter thereof, a second tubular member having an internal diameter which is substantially the same as the diameter at the ends of the tubular body, and fitting snugly within said bore in the first tubular body, the said second member having a rounded endwise closure at one end projecting slightly beyond the wall of the enlarged portion of the first tubular body, the second tubular body being welded to the first tubular body at the junctures thereof, means providing a valve seat within said second tubular member, said second tubular member having apertures upon opposite sides of said seat.

4. A length of pipe having a valve therein, said valve comprising a piece of seamless tubing extending transversely of the length of pipe and having opposite openings in it interiorly of the piece of pipe and offset in relation to one another, with the said transverse piece being in welded connection with the pipe, the transversely extending piece of tubing having a rounded end closure projecting beyond the piece of pipe at one side thereof and having its opposite end open for reception of a valve bonnet, and a valve seat positioned in the transverse tubing intermediate the offset openings within the confines of the piece of pipe, the said piece of seamless tubing fitting snugly within a transverse bore in said length of pipe, which bore is greater than the internal diameter of the length of pipe but substantially less than the external diameter thereof.

HARRY C. ELLIOTT.